US012572671B2

(12) United States Patent (10) Patent No.: US 12,572,671 B2
Judd (45) **Date of Patent: *Mar. 10, 2026**

(54) ACCESS CONTROL SYSTEM FOR AUTOMATICALLY ADJUSTING ACCESS TO RESOURCES IN RESPONSE TO DETECTING A ROLE CHANGE

(71) Applicant: Truist Bank, Charlotte, NC (US)

(72) Inventor: Kathlene Judd, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 226 days.

This patent is subject to a terminal disclaimer.

(21) Appl. No.: 18/499,592

(22) Filed: Nov. 1, 2023

(65) Prior Publication Data

US 2025/0139260 A1 May 1, 2025

Related U.S. Application Data

(63) Continuation of application No. 18/499,379, filed on Nov. 1, 2023.

(51) Int. Cl.
    *G06F 21/60* (2013.01)

(52) U.S. Cl.
    CPC .... *G06F 21/604* (2013.01); *G06F 2221/2141* (2013.01); *G06F 2221/2145* (2013.01)

(58) Field of Classification Search
    CPC ........... G06F 21/604; G06F 2221/2141; G06F 2221/2145
    USPC ............................................................. 726/4
    See application file for complete search history.

(56) References Cited

U.S. PATENT DOCUMENTS

| | | | | |
|---|---|---|---|---|
| 9,152,460 B1 * | 10/2015 | Adogla | ................. | G06F 9/5083 |
| 10,491,584 B2 * | 11/2019 | Tewari | ................ | H04L 63/0869 |
| 11,392,844 B1 * | 7/2022 | Rao | ..................... | G06F 11/3698 |
| 11,397,794 B1 * | 7/2022 | Baghani | .................. | G06F 21/44 |
| 11,895,121 B1 * | 2/2024 | Karim | .................... | H04L 63/20 |
| 2006/0294598 A1 * | 12/2006 | Lam | ...................... | H04L 63/105 726/28 |
| 2008/0307505 A1 * | 12/2008 | Persaud-Deolall | ......................... | G06F 21/6281 726/4 |
| 2015/0261956 A1 * | 9/2015 | Anderson | ............... | G06F 21/57 726/22 |

(Continued)

OTHER PUBLICATIONS

Ashraf Alkhresheh; DACIoT: Dynamic Access Control Framework for IoT Deployments; IEEE:2020; pp. 11401-11419.*

*Primary Examiner* — Monjur Rahim
(74) *Attorney, Agent, or Firm* — Kilpatrick Townsend & Stockton LLP; Michael A. Springs, Esq.

(57) ABSTRACT

A computer can detect a role change associated with an individual of a group of individuals. In response to detecting the role change, execute an automated process for adjusting access of the individual to one or more resources. The automated process can involve automatically interacting with computer systems. The automated process can involve automatically transmitting a first command to an identity management system. The automated process can involve automatically transmitting a second command to a workflow software server. The automated process can involve automatically transmitting a third command to an information asset management server. The automated process can involve automatically transmitting a fourth command to an equipment provisioning server.

15 Claims, 5 Drawing Sheets

(56)     References Cited

U.S. PATENT DOCUMENTS

| | | | |
|---|---|---|---|
| 2015/0358331 A1* | 12/2015 | Rachalwar | G06F 21/629 |
| | | | 726/7 |
| 2019/0052624 A1* | 2/2019 | Maheshwari | G06F 21/31 |
| 2021/0092124 A1* | 3/2021 | Albero | H04L 63/104 |
| 2022/0358190 A1* | 11/2022 | Baghani | G06F 21/121 |
| 2023/0004679 A1* | 1/2023 | Hernandez Santos | G06F 21/44 |
| 2024/0273229 A1* | 8/2024 | Bregman | G06N 5/04 |
| 2024/0362346 A1* | 10/2024 | Carao | G06F 21/604 |
| 2025/0124150 A1* | 4/2025 | Sun | G06F 21/604 |
| 2025/0131358 A1* | 4/2025 | Prabhakar | G06Q 10/0633 |

* cited by examiner

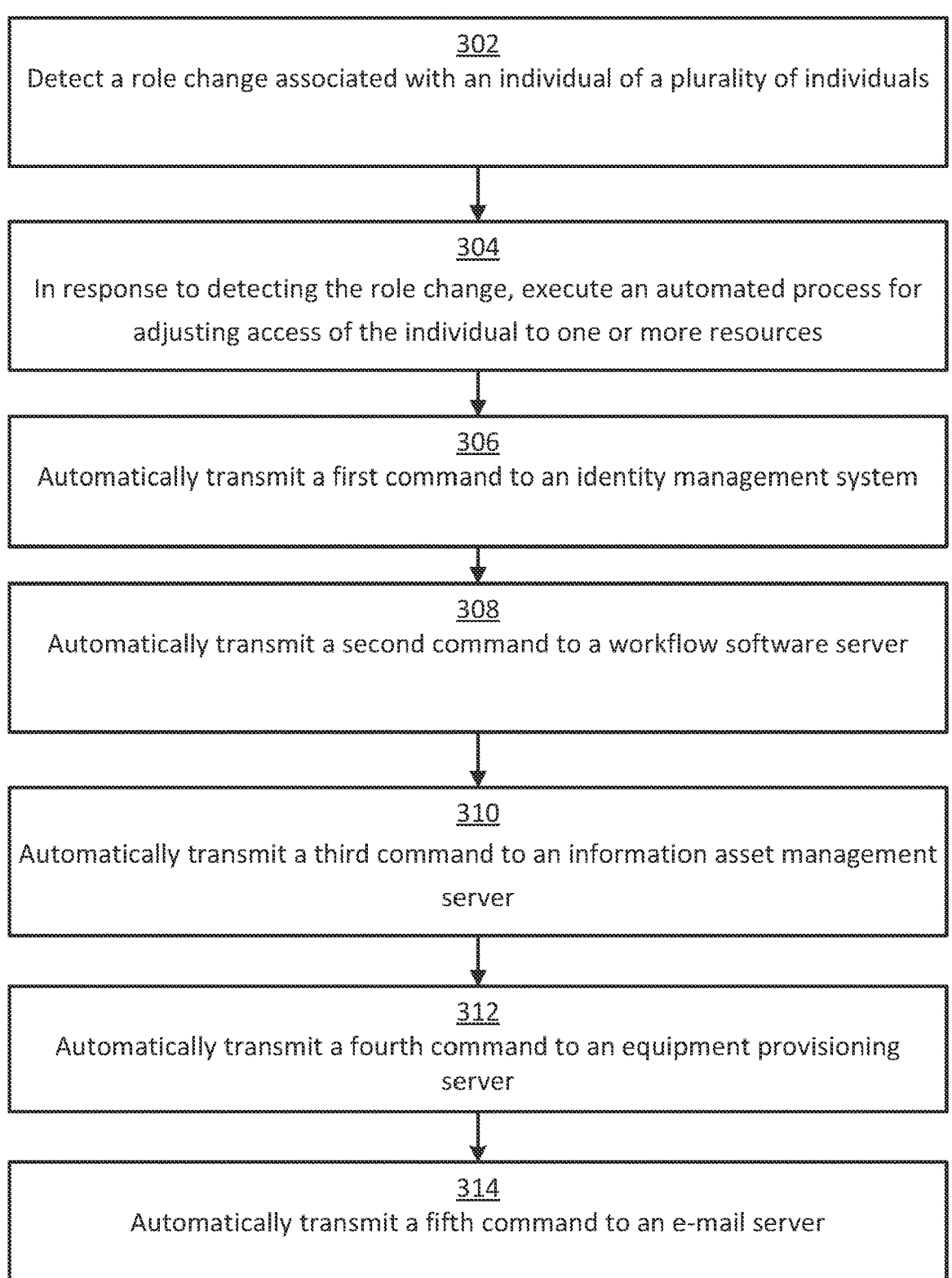

302
Detect a role change associated with an individual of a plurality of individuals 304
In response to detecting the role change, execute an automated process for adjusting access of the individual to one or more resources 306
Automatically transmit a first command to an identity management system 308
Automatically transmit a second command to a workflow software server 310
Automatically transmit a third command to an information asset management server 312
Automatically transmit a fourth command to an equipment provisioning server 314
Automatically transmit a fifth command to an e-mail server

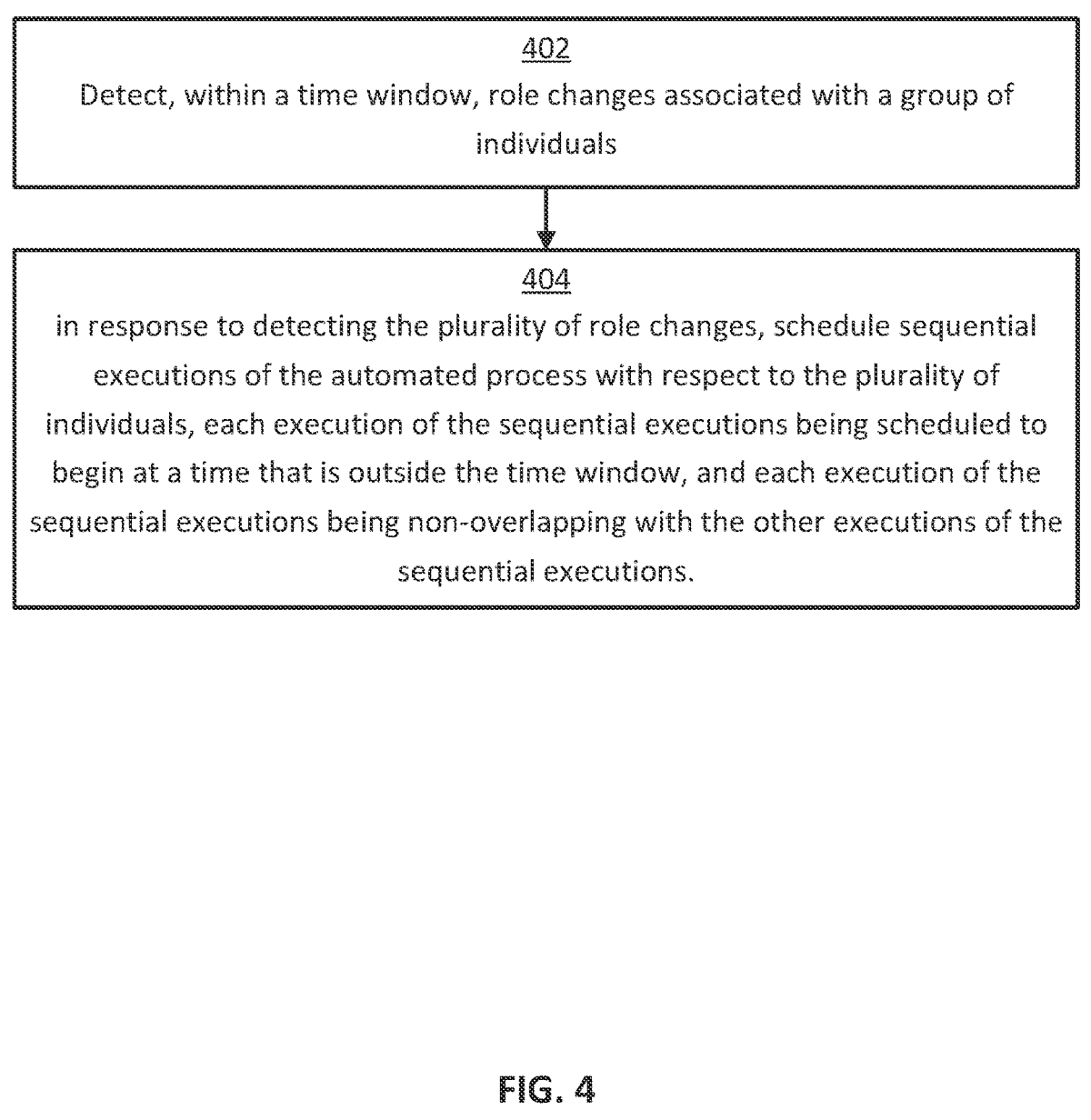

Detect, within a time window, role changes associated with a group of individuals

---

404 in response to detecting the plurality of role changes, schedule sequential executions of the automated process with respect to the plurality of individuals, each execution of the sequential executions being scheduled to begin at a time that is outside the time window, and each execution of the sequential executions being non-overlapping with the other executions of the sequential executions.

FIG. 4

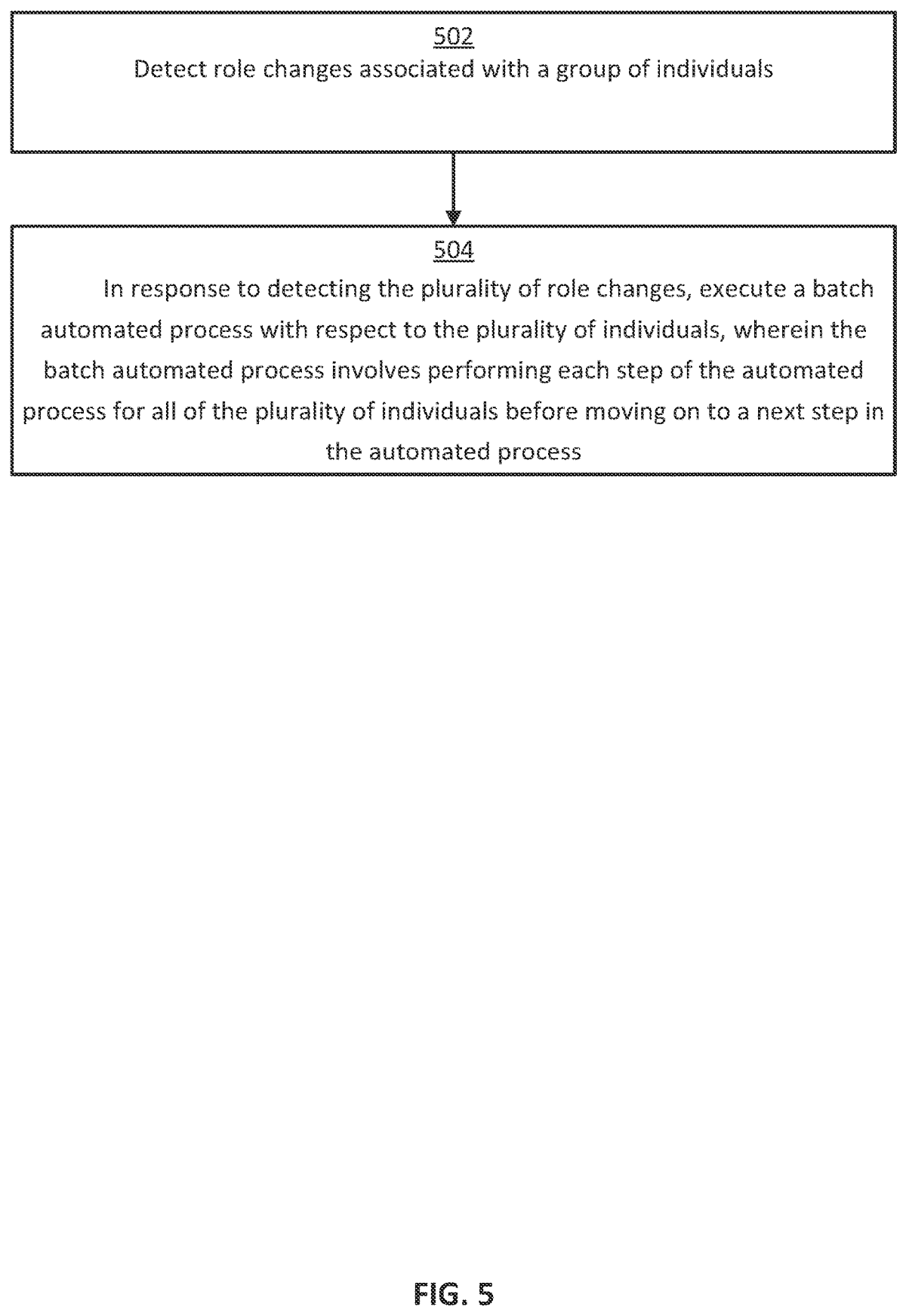

502
Detect role changes associated with a group of individuals

504
In response to detecting the plurality of role changes, execute a batch automated process with respect to the plurality of individuals, wherein the batch automated process involves performing each step of the automated process for all of the plurality of individuals before moving on to a next step in the automated process

FIG. 5

ACCESS CONTROL SYSTEM FOR AUTOMATICALLY ADJUSTING ACCESS TO RESOURCES IN RESPONSE TO DETECTING A ROLE CHANGE

CROSS REFERENCE TO RELATED APPLICATIONS

The present application is a continuation of U.S. patent application Ser. No. 18/499,379, filed Nov. 1, 2023 and titled "ACCESS CONTROL SYSTEM FOR AUTOMATICALLY ADJUSTING ACCESS TO RESOURCES IN RESPONSE TO DETECTING A ROLE CHANGE," which is incorporated herein by reference.

TECHNICAL FIELD

The present disclosure relates generally to access control using a computer system. More specifically, but not by way of limitation, this disclosure relates to computing systems for automatically adjusting access of an individual to resources in response to detecting a role change associated with the individual.

BACKGROUND

When a role of an individual in an organization is changed, it may be necessary to perform certain processes to enable the individual to perform their role in the organization. For instance, the organization may have a physical location, such as an office, that may have an office security system. The office security system may default to preventing the individual from entering the office. An office administrator may need to adjust the office security system to allow the individual to enter the office. Additionally, the individual may lack certain accounts, profiles, and access to certain resources that the individual may require as part of their role in the organization.

BRIEF DESCRIPTION OF THE DRAWINGS

FIG. 3 is a flow chart of an example of a process for automatically adjusting access of an individual to resources in response to detecting a role change associated with the individual according to some aspects of the present disclosure.

FIG. 4 is a flow chart of a sequential process for automatically adjusting access of multiple individuals to resources in response to detecting a role change associated with the individual according to some aspects of the present disclosure.

FIG. 5 is a flow chart of a batch process for automatically adjusting access of groups of individuals to resources in response to detecting a role change associated with the individual according to some aspects of the present disclosure.

DETAILED DESCRIPTION

Figure 1:
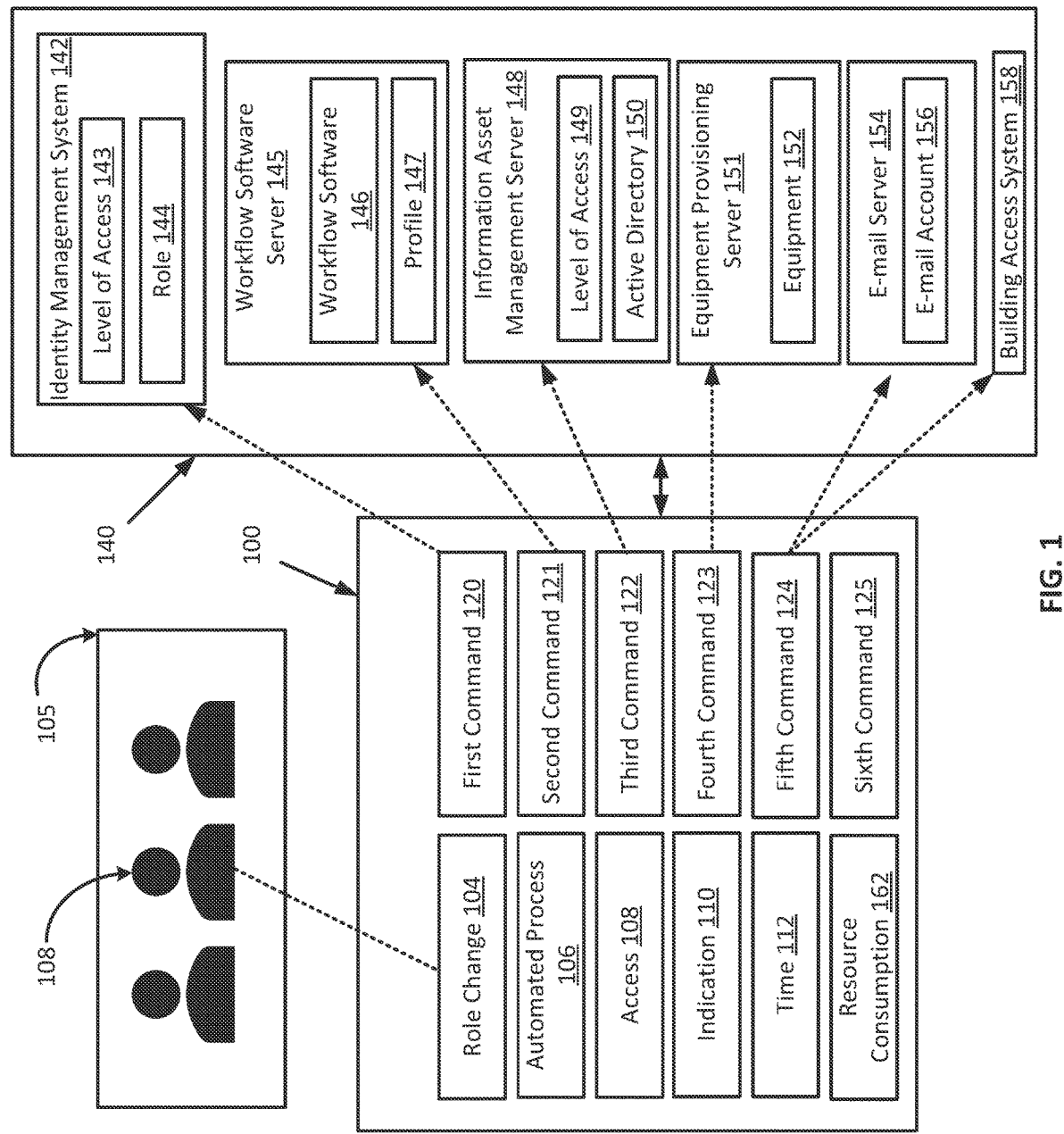
FIG. 1 is a block diagram of an example of an access control system for automatically adjusting access of an individual to resources in response to detecting a role change associated with the individual according to some aspects of the present disclosure.

An individual in an organization may experience a role change. For example, the individual may be hired, fired, moved from one role to another, or moved to another location associated with the organization. After an individual experiences the role change, it may be desirable to perform certain tasks to enable the individual to access certain resources. The tasks may involve providing the individual with permissions to access computer systems associated with the organization, generating a profile for the individual in a workflow software, enabling the individual to access one or more active directories, provisioning equipment to the individual, generating an e-mail account for the individual, or any other suitable tasks.

Conventionally, these tasks may be manually performed by one or more persons that are associated with the organization. For instance, providing the individual with access to computer systems associated with the organization may involve an IT administrator accessing the computer systems via one or more pieces of software. The one or more pieces of software may have graphical user interfaces that can be instantiated and displayed to the IT administrator, who may proceed to manually adjust permissions associated with the individual. Similarly, provisioning equipment to the individual can involve an equipment administrator accessing equipment provisioning software executing on an equipment provisioning server to provide the equipment provisioning server with a request to provision one or more pieces of equipment to the individual. The equipment provisioning software may involve one or more graphical user interfaces that may need to be interacted with by the equipment administrator in order to generate the request to provision the one or more pieces of equipment to the individual. Other tasks may similarly involve other administrators interacting with various graphical user interfaces that may need to be generated and updated in order to facilitate their respective tasks.

The abovementioned manual tasks can consume a significant amount of computing resources (e.g., memory, processing power, network bandwidth, etc.). For example, generating the graphical user interfaces with which the users manually interact to perform their respective tasks may involve several back-and-forth communications between the backend servers and the client devices of the users, which can consume network bandwidth. The corresponding GUI operations on the backend servers and client devices can also consume processing power and memory, which may slow down their performance of other tasks. Additionally, these user interactions can introduce delays and human errors. For example, a user interacting with one of the servers may provide an erroneous input value or make an erroneous selection, thereby causing the task to be performed incorrectly. Further, there can be many users that are concurrently logged onto the network and trying to interact with the same software/interfaces to perform their respective tasks in the same time window (e.g., between 9:00 AM and 5:00 PM), which can may overload the system and/or generate latency.

Some examples of the present disclosure can overcome the aforementioned problems by executing an automated process for adjusting access of the individual to one or more resources in response to detecting the role change associated with the individual. The automated process can involve automatically transmitting a series of commands to various computer systems to cause the computer systems to perform the tasks. These commands may be transmitted via application programming interfaces (APIs) with predefined protocols. Performing the tasks via the automated process may reduce resource consumption by avoiding and reducing the size of network communications, and by preventing graphical user interfaces from being generated and updated by the servers and/or client devices in response to user interactions. Additionally, the automated process can prevent human errors from being introduced by administrators that may otherwise be involved in facilitating the tasks. The automated process may also prevent human-related security vulnerabilities and decrease human-related operating costs by reducing the number of persons involved in facilitating the tasks. In some examples, the automated process can also be scheduled for execution at one or more times of day, which can be selected to avoid overloading one or more of the computer systems. For instance, the automated process may be performed with respect to multiple individuals in a sequential or batched manner outside of normal working hours or at other times of day selected to avoid overloading one or more of the computer systems. This can improve the operation of the computer systems and reduce the latency experienced by users trying to use the computer systems during normal working hours.

As noted above, the automated process can involve automatically interacting with multiple computer systems. For example, the automated process can involve automatically transmitting a first command to an identity management system to cause the identity management system to grant the individual a particular level of access to one or more computer systems. The particular level of access to the one or more computer systems can depend on a role of the individual following the role change. The automated process can involve automatically transmitting a second command to a workflow software server to cause the workflow software server to generate a profile for the individual in the workflow software based on the role of the individual.

In some examples, the automated process can involve automatically transmitting a third command to an information asset management server to cause the information asset management server to provide the individual with a particular level of access to an active directory based on the role of the individual The automated process may also involve automatically transmitting a fourth command to an equipment provisioning server. The fourth command can cause the equipment provisioning server to provision particular equipment to the individual based on their role.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of an access control system 100 for automatically adjusting access of an individual 108 to resources in response to detecting a role change 104 according to some aspects of the present disclosure. The access control system 100 can include a single computing device, such as a server, or may be distributed across a number of computing devices that can be communicatively coupled with each other. The access control system 100 can detect a role change 104 associated with the individual 108. For example, the system 100 can receive a notification indicating that the individual 108 is undergoing or is scheduled to undergo a role change 104. In some examples, the individual 108 may be an employee of an organization that may be associated with the access control system 100.

In response to detecting the role change 104, the access control system 100 can execute an automated process 106. In some examples, the automated process 106 can involve adjusting access of the individual 108 to one or more resources. The automated process 106 can involve interacting with one or more computer systems 140. The computer systems 140 can include an identity management system 142, a workflow software server 145, an information asset management server 148, an equipment provisioning server 151, an e-mail server 154, a building access system 158, and any other suitable servers or systems.

The automated process 106 can involve automatically transmitting a first command to an identity management system 142 to cause the identity management system 142 to grant the individual a particular level of access to one or more of the computer systems 140. The identity management system 142 can include a database that can include identities associated with individuals as well as permissions that may be associated with the identities. For example, the identity management system 142 can issue one or more application programming interface (API) requests to the workflow software server 145, the information asset management server 148, the equipment provisioning server 151, the e-mail server 154, and/or the building access system 158 to provide the individual 108 with access thereto. The particular level of access 149 to the one or more computer systems can depend on the role of the individual 108 after the role change 104.

The automated process 106 can involve automatically transmitting a second command 121 to a workflow software server 145 to cause the workflow software server 145 to generate a profile 147 for the individual 108 in the workflow software 146. The profile 147 can be generated based on the role 144 of the individual 108. The workflow software server 145 can execute a workflow software 146. The individual 108 can access the workflow software via their respective profile 147 to perform workflow-related tasks. For example, the individual 108 can access the workflow software 146 to schedule meetings, create to-do items, and write notes. The profile 147 can include configuration settings associated with the individual 108 and can adjust an instance of the workflow software 146 based on the configuration settings.

In some examples, the automated process 106 can involve automatically transmitting a third command 122 to an information asset management server 148 to cause the information asset management server 148 to provide the individual 108 with a particular level of access 149 to an active directory 150 based on the role 144 of the individual 108. The active directory 150 can be a service, such as a database, that can store information related to one or more computing devices in a network as well as their users. Additionally or alternatively, the active directory 150 can be a shared folder that may be accessed by one or more users. In some examples, the active directory 150 may be stored on the information asset management server 148. In some examples, the active directory 150 may be stored on an external server and managed by the information asset management server 148. The information asset management server 148 can manage permissions associated with the access of the individual 108 to the active directory 150. In particular, the information asset manager can determine whether the individual 108 may read from the active directory 150, write to the active directory 150, or perform other operations associated with the active directory 150.

The automated process 106 may also involve automatically transmitting a fourth command 123 to an equipment provisioning server 151. The equipment provisioning server 151 can store information related to equipment that can be provisioned to the individual 108. For example, the equipment provisioning server 151 can include types and quantities of equipment that can be provisioned to the individual 108. The equipment provisioning server 151 can also be used to assign equipment to individuals, and store information about the assignments of equipment to individuals. The fourth command 123 can cause the equipment provisioning server 151 to provision particular equipment 152 to the individual 108 based on their role 144. For example, the equipment provisioning server 151 can generate and transmit a request to an equipment management entity to provide the individual 108 with equipment 152 that the individual may need in order to perform functions associated with their role 144. The equipment 152 can include computing hardware such as laptop computers, desktop computers, webcams, headsets, microphones, or any other suitable computing hardware. Additionally or alternatively, the equipment 152 can include computing software, such as editing software, word processing software, conferencing software, VoIP software, or any other suitable software.

In some examples, the automated process 106 can involve automatically transmitting a fifth command 124 to an e-mail server 154. The e-mail server 154 may be included in the computing systems 140. The fifth command 124 can cause the e-mail server 154 to generate an e-mail account 156 that is associated with the individual 108. The e-mail server 154 can receive and transmit e-mails to and from users of the e-mail server 154.

In some examples, the system 100 can transmit a sixth command 125 to a building access system 158. The sixth command 125 can cause the building access system 158 to provide the individual 108 with access to a building associated with the building access system 158. In some examples, the building access system 158 can provide the individual 108 with physical access to a building based on their role 144. For example, the building access system 158 can enable a keycard associated with the individual 108 to unlock certain entryways associated with the building.

In some examples, the access control system 100 can execute a mapping program that can determine the commands which are to be transmitted based on the role 144. Additionally, the mapping program may determine that certain commands are unnecessary based on the role 144 and may prevent the commands from being transmitted. In some examples, the access control system 100 can transmit a request to each of the computer systems 140 to retrieve formatting requirements associated with the computer systems 140. In some examples, the access control system 100 can access a database of formatting requirements that may indicate formatting requirements associated with each of the computer systems 140. The access control system 100 can execute a formatting program that can alter a format of the request in accordance with certain formatting requirements associated with the computing systems 140. For example, the formatting program may translate a command generated in a declarative format into a command that is in a lightweight data interchange format, such as JSON. Alternatively, the formatting program may translate a command in a lightweight format to one in a declarative format.

In some examples, the access control system 100 can dynamically adjust an execution time of the automated process 106 to avoid overloading the access control system 100 or the computing systems 140 associated therewith. For example, the access control system 100 may automatically schedule the execution of the automated process 106 at certain times of day or on certain days that are known to have lower loading conditions (e.g., on nights, weekends, and holidays), because fewer users are interacting with the computing systems 140 at those times. The access control system 100 can be preprogrammed with those days/times and automatically schedule the execution of automated process 106 for one of those days/times.

Additionally or alternatively, the access control system 100 can predict a future point in time in which the loading conditions on one or more of the computing systems 140 will be acceptably low to allow for the execution of at least some of the automated process 106. For example, prior to executing the automated process 106, the access control system 100 can receive an indication that a computing resource consumption 162 associated with one or more of the computing systems 140 meets or exceeds a predefined threshold. The access control system 100 may receive the predefined threshold from a user or from one or more of the computing systems 140. Alternatively, the access control system 100 may determine the predefined threshold. Either way, in response to receiving the indication 110, the access control system 100 can predict a future time 112 (or a future time window) at which the computing resource consumption 162 of the one or more computer systems 140 will be beneath the predefined threshold.

To determine such predictions, the access control system 100 can use a predictive model. Examples of the predictive model can be an autoregressive integrated moving average (ARIMA) model, an exponential smoothing model (ESM), or other model that can generate a time series forecast. In some examples, the predictive model can include a trained machine-learning model, such as a neural network. The predictive model can be tuned or trained using historical data, so that it can accurately make predictions about the future. For example, the predictive model can generate a forecast of computing resource consumption over a future time window based on historical data about computing resource consumption. If certain periods in the historical data had decreased computing resource consumption, and then related periods in the future time window may also have decreased computing resource consumption. Based on such predictions, the access control system 100 can initiate the automated process 106 during the future time window, such as at a particular future time 112 during the future time window. This can help constrain the times at which the automated process 106 is executed to those with decreased resource consumption. Preventing the automated process 106 from executing prior to the time 112 (or outside a target time window) at which the computing resource consumption 162 is beneath the predefined threshold can prevent the system 100 from overloading the one or more computer systems 140.

In some examples, the system 100 can receive an indication that the role 144 associated with the individual 108 has changed from a first role 144 to a second role 144. The first role 144 may include a first level of access to the one or more resources, and the second role 144 may include a second level of access to the one or more resources. The second level of access may include access to more or fewer resources than the first level of access. For example, the first level of access may provide the individual 108 with access to a limited subset of the active directory, whereas the second level of access may provide the individual with access to an entirety of the active directory. In response to receiving the indication, the system 100 can transmit one or more commands to one or more of the computer systems 140 to restrict the access of the individual 108 to the one or more resources to the second level of access. For example, the one or more commands can cause the one or more computer systems 140 to alter one or more permissions associated with access of the individual 108 to the one or more resources to enable or disable access thereto.

In some examples, the access control system 100 can schedule sequential executions of the automated process 106 for groups of individuals 105 in order to avoid overloading the access control system 100. For example, the system 100 can detect, within a time window, a set of role changes associated with a group of individuals 105. In response to detecting the role changes, the access control system 100 can schedule sequential executions of the automated process 106 for the individuals 105. Each execution of the sequential executions of the automated process 106 may be scheduled to begin at a time that is outside the time window, and each execution of the sequential executions can be non-overlapping with the other executions of the sequential executions.

In some examples, the access control system 100 can execute the automated process 106 for groups of individuals 105 in batches. Processing the individuals 105 in batches may enable the access control system 100 to make fewer API calls to the computing systems 140, thereby conserving computing resources both for the access control system 100 and the computing systems 140. In particular, the system 100 detect role changes associated with the individuals 105. In response to detecting the role changes, the system can execute a batch automated process for the individuals 105. The batch automated process may involve performing each step of the automated process 106 for all of the individuals 105 before moving on to a next step in the automated process 106. For example, the access control system 100 can select multiple individuals to include in a batch. The access control system 100 can perform a first step of the automated process 106 for all of the individuals in the batch. An example of the first step may be interacting with the identity management system 142. Once the first step of the automated process 106 has been completed for all of the individuals in the batch, the access control system 100 can perform a second step of the automated process 106 for all of the individuals in the batch. An example of the second step may be interacting with the workflow software server 145. And so on. This batched approach can reduce the number of individual communications and interactions with the computer systems 140 to perform each step in the automated process 106, thereby conserving computing resources and reducing network bandwidth consumption.

Figure 2:
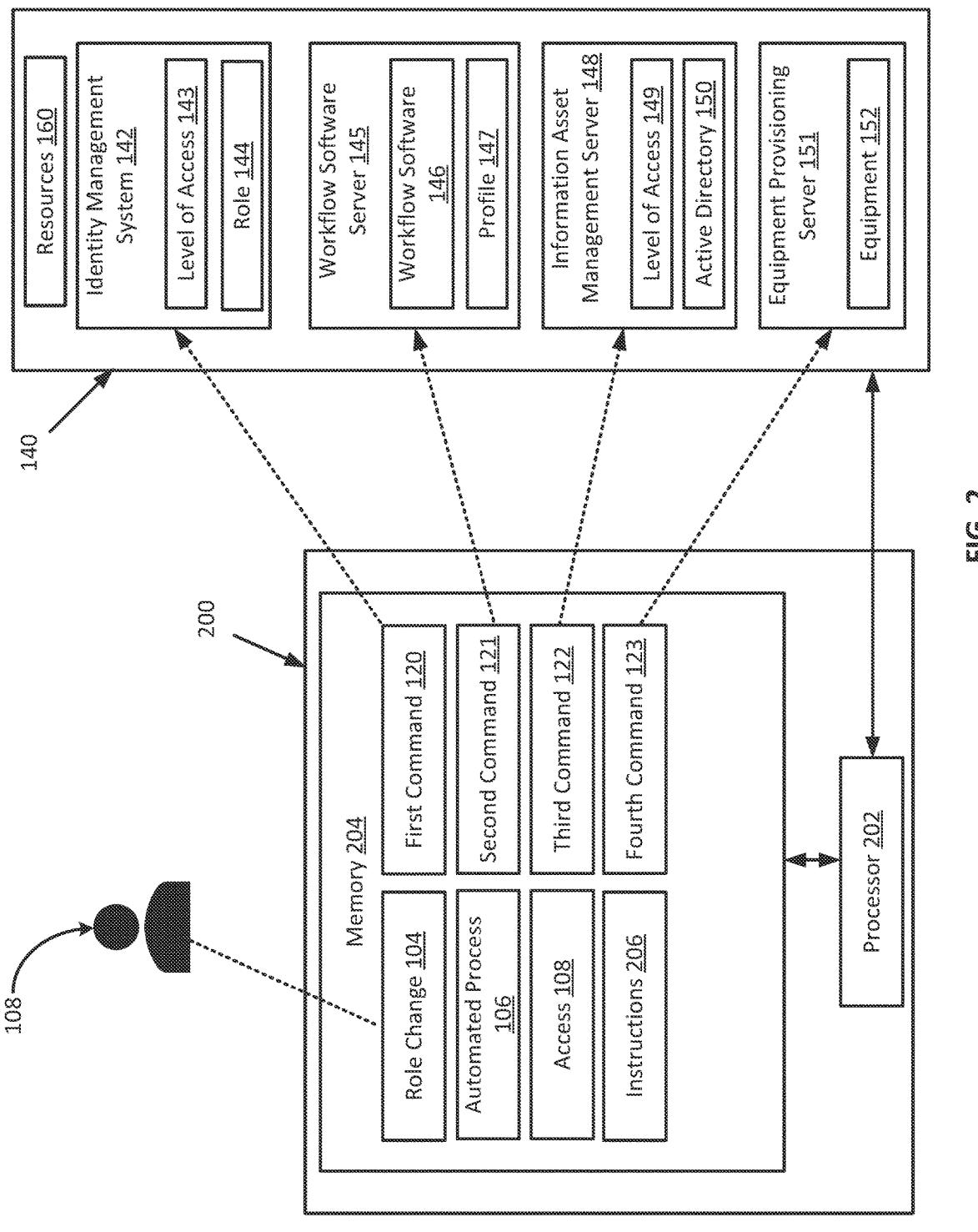
FIG. 2 is a block diagram of an example of an access control system for automatically adjusting access of an individual to resources in response to detecting a role change associated with the individual according to some aspects of the present disclosure.

FIG. 2 is a block diagram of an example of an access control system for automatically adjusting access of an individual to resources in response to detecting a role change according to some aspects of the present disclosure. FIG. 2 is described with reference to components in FIG. 1. In some examples, the access control system 200 can be the same as or different from the access control system 100.

The access control system 200 can include a processing device 202 coupled to a memory 204. The processing device 202 can include one or more processors. Examples of the processing device 202 can include a Field-Programmable Gate Array (FPGA), an application-specific integrated circuit (ASIC), or a microprocessor. The processing device 202 can execute instructions 206 stored in the memory 204 to perform one or more operations. In some examples, the instructions 206 can include processor-specific instructions generated by a compiler or an interpreter from code written in any suitable computer-programming language, such as C, C++, C#, and Java.

The memory 204 can include one memory device or multiple memory devices. The memory 204 can be volatile or non-volatile, in that the memory 204 can retain stored information when powered off. Examples of the memory 204 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processing devices 202 with the instructions 206 or other program code. Non-limiting examples of a computer-readable medium include magnetic disks, memory chips, ROM, random-access memory (RAM), an ASIC, a configured processing device, optical storage, or any other medium from which a computer processing device can read the instructions 206.

In response to detecting the role change 104, the processing device 202 can execute an automated process 106. In some examples, the automated process 106 can involve adjusting access of the individual 108 to one or more resources (e.g., virtual and/or physical resources). In some examples, the one or more resources can include the active directory 150, a building, an e-mail account, certain equipment 152, one or more of the computer systems 140, or any combination thereof. To adjust the individual's access to the one or more resources, the processing device 202 can interact with one or more computer systems 140. The computer systems 140 can include an identity management system 142, a workflow software server 145, an information asset management server 148, an equipment provisioning server 151, and e-mail server 154, a building access system 158, and any other suitable servers or systems.

For example, the processing device 202 can automatically transmit a first command 120 as an API request to an API associated with an identity management system 142. The first command 120 can cause the identity management system 142 to grant the individual 108 certain permissions associated with one or more of the other computer systems 140. For example, the identity management system 142 can issue one or more API requests to modify permissions stored in the workflow software server 145, the information asset management server 148, the equipment provisioning server 151, the e-mail server 154, and/or the building access system 158 to provide the individual 108 with different types of access thereto. The access control system 100 can determine which permissions to grant to the individual 108 and for which of the computing systems 140 based on a role of the individual 108 following the role change 104. In some examples, the processing device 202 can automatically transmit a second command 121 to a workflow software server 145. The second command 121 can include data associated with the individual 108 with which the workflow software server may generate a profile 147 for the individual 108 in the workflow software 146. In some examples, the profile 147 may also be based on the role 144 of the individual 108.

In some examples, the processing device 202 can automatically transmit a third command 122 to an information asset management server 148 to cause the information asset management server 148 to provide the individual 108 with certain privileges associated with an active directory 150 based on the role 144 of the individual. The privileges may grant the individual 108 with the ability to retrieve data from certain devices in the active directory 150, write to certain devices in the active directory 150, and execute programs on certain devices in the active directory 150.

In some examples, the processing device 202 can automatically transmit a fourth command 123 to an equipment provisioning server 151. The fourth command 123 can specify certain equipment that the equipment provisioning server 151 may provision to the individual 108 based on their role 144. For example, the access control system 100 can specify particular models of equipment 152 and quantities of equipment 152 to the equipment provisioning server 151, which may in turn generate a request to an equipment manager to provide the individual 108 with equipment 152.

FIG. 3 is a flow chart of an example of a process for automatically adjusting access of an individual to resources in response to detecting a role change according to some aspects of the present disclosure. While FIG. 3 depicts a certain sequence of steps for illustrative purposes, other examples can involve more steps, fewer steps, different steps, or a different order of the steps than is depicted in FIG. 3. The steps of FIG. 3 are described below with reference to components of FIG. 1 and FIG. 2.

At block 302, the access control system 100 can detect a role change 104 associated with an individual 108. The individual 108 may be included in a group of individuals 105. In some examples, detecting the role change 104 can involve communicating with the computing systems 140 to determine whether or not there has been a role change 104. For example, the role change can be input to the identity management system 142 by a user. In response, the identity management system 142 may automatically transmit a communication to the access control system 100 indicating that the role change occurred. Additionally or alternatively, the access control system 100 can periodically request information about role changes from the identity management system 142 or other computing devices 140. In response, the access control system 100 can receive an indication that there has been a role change 104 associated with the individual 108.

At block 304, the access control system 100 can execute an automated process 106 for adjusting access of the individual 108 to one or more resources. The automated process 106 can involve automatically transmitting one or more commands to one or more of the computing systems 140. In some examples, the system 100 can transmit the one or more commands to the computing systems 140 as API requests. In some examples, the access control system 100 can determine which commands to generate and to which computing system(s) they are to be transmitted based on information associated with the new role 144. For example, the access control system 100 may determine that it is necessary to provision new equipment to an individual 108 if the new role 144 requires different equipment from the previous role and can generate and issue a command accordingly. Because not all role changes will require the same set of commands to the same set of computing systems 140, in some examples the access control system 100 can access a predefined lookup table or a rule set to determine which commands to issue to which computing systems 140. The predefined lookup table may, for example, map certain role changes to certain commands.

At block 306, the access control system 100 can automatically transmit a first command to an identity management system. The first command 120 can cause the identity management system 142 to grant the individual a particular level of access to one or more of the computer systems 140. In some examples, the level of access may correspond to a set of permissions. For example, the level of access may specify whether the individual may read or write certain data or execute certain programs.

At block 308, the access control system 100 can automatically transmit a second command 121 to a workflow software server 146. The second command 121 can be an API request that can cause the workflow software server 146 to generate a profile 147 for the individual 108 on the workflow software 146. Additionally, the second command 121 can cause the workflow software 146 to provide the individual 108 with access to the workflow software 146 and/or the workflow software server 146.

At block 310, the access control system 100 can automatically transmit a third command 122 to an information asset management server 148. The third command 122 can cause the information asset management server 148 to provide the individual 108 with a particular level of access 149 to an active directory 150 based on the role 144 of the individual 108.

At block 312, the access control system 100 can automatically transmit a fourth command 123 to an equipment provisioning server 151. The fourth command 123 can cause the equipment provisioning server 151 to provision particular equipment 152 to the individual 108 based on their role 144.

At block 314, the access control system 100 can automatically transmit a fifth command 124 to an e-mail server 154. Additionally or alternatively, the access control system 100 can transmit the sixth command 125 to a building access system 158.

FIG. 4 is a flow chart of an example of a sequential process for automatically adjusting access of multiple individuals to resources in response to detecting a role change according to some aspects of the present disclosure. While FIG. 4 depicts a certain sequence of steps for illustrative purposes, other examples can involve more steps, fewer steps, different steps, or a different order of the steps than is depicted in FIG. 4. The steps of FIG. 5 are described below with reference to components of FIG. 1 and FIG. 2.

At block 402, the access control system 100 can detect, within a time window, a set of role changes associated with a group of individuals 105. One example of the time window may be between Monday and Friday of a given week. Another example of the time window may be a 12 hour time period on a given day. Detecting the role changes can involve receiving one or more notifications from one or more of the computing systems 140 indicating the role changes.

At block 404, the access control system 100 can schedule sequential executions of the automated process 106 for the individuals 105 in response to detecting the role changes. Each execution of the sequential executions of the automated process 106 may be scheduled to begin at a time that is outside the time window, so that each execution of the sequential executions does not overlap with the other executions of the sequential executions. For example, if the time window is Monday through Friday, the sequential executions may be scheduled to take place on Saturday and Sunday. In some examples, sequentially executing the automated process 106 over several non-overlapping windows of time can prevent excessive use of computing resources by limiting the amount of automated processes that are executing at any time.

FIG. 5 is a flow chart of an example of a batch process for automatically adjusting access of groups of individuals to resources in response to detecting a role change according to some aspects of the present disclosure. While FIG. 5 depicts a certain sequence of steps for illustrative purposes, other examples can involve more steps, fewer steps, different steps, or a different order of the steps than is depicted in FIG. 5. The steps of FIG. 5 are described below with reference to components of FIG. 1 and FIG. 2.

At block 502, the access control system 100 can detect role changes associated with a group of individuals 105. The role changes for the group of individuals 105 can be detected within a time window. One example of the time window may be between Monday and Thursday of a given week. Another example of the time window may be an 8 hour time period on a given day. Detecting the role changes can involve receiving one or more notifications from one or more of the computing systems 140 indicating the role changes.

At block 504, the access control system 100 can execute a batch automated process for the individuals 105. The access control system 100 can schedule batch process for the individuals 105 in response to detecting the role changes. The batch process may be scheduled to begin at a time that is outside the time window. For example, if the time window is Monday through Thursday, the batch process may be scheduled to take place on Friday. As another example, if the time window is 6:00 AM-6:00 PM on a given day, the batch automated process may be schedule to take place at 8:00 PM on that day. The batch automated process can involve performing each step of the automated process 106 for all of the individuals 105 before moving on to a next step in the automated process 106.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

What is claimed is:

1. A system comprising:

a processor; and a memory comprising program code that is executable by the processor for causing the processor to:

identify an individual of a plurality of individuals in which the individual has an associated role;

determine that the associated role of the individual is obsolete and that the individual is newly associated with a second role;

determine a predefined threshold that defines a level of computing resource consumption that is likely to cause an overload in a plurality of computer systems;

receive an indication that a computing resource consumption of at least one computer system of the plurality of computer systems exceeds the predefined threshold;

in response to receiving the indication, and based at least in part on historical usage data associated with the plurality of computer systems, execute a predictive model to generate a prediction of a future time within a future time window in which the computing resource consumption of the at least one computer system will be beneath the predefined threshold, wherein the predictive model comprises a trained machine-learning model and either an autoregressive integrated moving average model or an exponential smoothing model, wherein the trained machine-learning model is trained based on the historical usage data and is configured to generate a future time window to include in the prediction; and based on determining that the associated role of the individual is obsolete and that the individual is newly associated with the second role, execute an automated process for adjusting access of the individual to one or more resources, wherein the automated process involves automatically transmitting one or more commands to the plurality of computer systems at the future time.

2. The system of claim 1, wherein the memory further comprises program code for the automated process that is executable by the processor for causing the processor to:

access a predefined lookup table that correlates role changes to commands; and using the predefined lookup table, determine which of the commands to issue to which computer systems of the plurality of computer systems based on the role change.

3. The system of claim 1, wherein the memory further comprises program code that is executable by the processor for causing the processor to:

prior to transmitting the one or more commands to the plurality of computer systems, alter a format of the one or more commands in accordance with formatting requirements associated with the plurality of computer systems.

4. The system of claim 1, detect, within a time window, a plurality of role changes associated with the plurality of individuals; and in response to detecting the plurality of role changes in the time window, schedule sequential executions of the automated process with respect to the plurality of individuals, each execution of the sequential executions being scheduled to begin at or after the future time, the future time being outside the time window, and each execution of the sequential executions being non-overlapping with the other executions of the sequential executions.

5. The system of claim 1, wherein the memory further comprises program code that is executable by the processor for causing the processor to:

detect a plurality of role changes associated with the plurality of individuals; and in response to detecting the plurality of role changes and at the future time, execute a batch automated process with respect to the plurality of individuals, wherein the batch automated process involves performing each step of the automated process for all of the plurality of individuals before moving on to a next step in the automated process.

6. The system of claim 1, wherein the associated role has a first level of access to one or more resources, wherein the second role has a second level of access to the one or more resources that is higher than the first level of access, and wherein the one or more commands comprise instructions to increase a level of access of the individual according to the second level of access.

7. A computer-implemented method comprising:

identifying an individual of a plurality of individuals in which the individual has an associated role;

determining that the associated role of the individual is obsolete and that the individual is newly associated with a second role;

determining a predefined threshold that defines a level of computing resource consumption that is likely to cause an overload in a plurality of computer systems;

receiving an indication that a computing resource consumption of at least one computer system of the plurality of computer systems exceeds the predefined threshold;

in response to receiving the indication, and based at least in part on historical usage data associated with the plurality of computer systems, executing a predictive model to generate a prediction of a future time within a future time window in which the computing resource consumption of the at least one computer system will be beneath the predefined threshold, wherein the predictive model comprises a trained machine-learning model and either an autoregressive integrated moving average model or an exponential smoothing model, wherein the trained machine-learning model is trained based on the historical usage data and is configured to generate a future time window to include in the prediction; and based on determining that the associated role of the individual is obsolete and that the individual is newly associated with the second role, executing an automated process for adjusting access of the individual to one or more resources, wherein the automated process involves automatically transmitting one or more commands to the plurality of computer systems at the future time.

8. The method of claim 7, further comprising:

accessing a predefined lookup table that correlates role changes to commands; and using the predefined lookup table, determining which of the commands to issue to which computer systems of the plurality of computer systems based on the role change.

9. The method of claim 7, further comprising:

prior to transmitting the one or more commands to the plurality of computer systems, altering a format of the one or more commands in accordance with formatting requirements associated with the plurality of computer systems.

10. The method of claim 7, further comprising:

detecting, within a time window, a plurality of role changes associated with the plurality of individuals; and in response to detecting the plurality of role changes in the time window, scheduling sequential executions of the automated process with respect to the plurality of individuals, each execution of the sequential executions being scheduled to begin at or after the future time, the future time being outside the time window, and each execution of the sequential executions being non-overlapping with the other executions of the sequential executions.

11. The method of claim 7, further comprising:

detecting a plurality of role changes associated with the plurality of individuals; and in response to detecting the plurality of role changes and at the future time, execute a batch automated process with respect to the plurality of individuals, wherein the batch automated process involves performing each step of the automated process for all of the plurality of individuals before moving on to a next step in the automated process.

12. A non-transitory computer-readable medium comprising program code that is executable by a processing device for causing the processing device to:

identify an individual of a plurality of individuals in which the individual has an associated role;

determine that the associated role of the individual is obsolete and that the individual is newly associated with a second role;

determine a predefined threshold that defines a level of computing resource consumption that is likely to cause an overload in a plurality of computer systems;

receive an indication that a computing resource consumption of at least one computer system of the plurality of computer systems exceeds the predefined threshold;

in response to receiving the indication, and based at least in part on historical usage data associated with the plurality of computer systems, execute a predictive model to generate a prediction of a future time within a future time window in which the computing resource consumption of the at least one computer system will be beneath the predefined threshold, wherein the predictive model comprises a trained machine-learning model and either an autoregressive integrated moving average model or an exponential smoothing model, wherein the trained machine-learning model is trained based on the historical usage data and is configured to generate a future time window to include in the prediction; and based on determining that the associated role of the individual is obsolete and that the individual is newly associated with the second role, execute an automated process for adjusting access of the individual to one or more resources, wherein the automated process involves automatically transmitting one or more commands to the plurality of computer systems at the future time.

13. The non-transitory computer-readable medium of claim 12, wherein the non-transitory computer-readable medium further comprises program code that is executable by the processing device for causing the processing device to:

access a predefined lookup table that correlates role changes to commands; and using the predefined lookup table, determine which of the commands to issue to which computer systems of the plurality of computer systems based on the role change.

14. The non-transitory computer-readable medium of claim 12, wherein the non-transitory computer-readable medium further comprises program code that is executable by the processing device for causing the processing device to:

prior to transmitting the one or more commands to the plurality of computer systems, alter a format of the one or more commands in accordance with formatting requirements associated with the plurality of computer systems.

15. The non-transitory computer-readable medium of claim 12, further comprising program code that is executable by the processing device for causing the processing device to:

detect, within a time window, a plurality of role changes associated with the plurality of individuals; and in response to detecting the plurality of role changes in the time window, schedule sequential executions of the automated process with respect to the plurality of individuals, each execution of the sequential executions being scheduled to begin at or after the future time, the future time being outside the time window, and each execution of the sequential executions being non-overlapping with the other executions of the sequential executions.

* * * * *